Nov. 17, 1959  F. L. BREEDEN  2,912,938
WATER CHLORINATING APPARATUS
Filed June 14, 1956  2 Sheets-Sheet 2

Fearl L. Breeden
INVENTOR.

BY

United States Patent Office

2,912,938
Patented Nov. 17, 1959

2,912,938

WATER CHLORINATING APPARATUS

Fearl L. Breeden, Morristown, Tenn., assignor of one-half to George W. Jaynes, Morristown, Tenn.

Application June 14, 1956, Serial No. 591,451

2 Claims. (Cl. 103—153)

The present invention relates to certain new and useful improvements in an apparatus for chlorinating water.

Briefly summarized, the invention, in its preferred simplified embodiment, is characterized by a pump embodying a linearly straight elongate cylinder, a piston reciprocable in said cylinder, a prime mover, an operating connection between said prime mover and piston, a chlorine container having valved communicating connection with the intake end of said cylinder, and a valved conduit communicatively united to said intake end, the stated valves being alternately operable in a sequence that chlorine is drawn into the cylinder on the suction stroke of the piston and shunted from the cylinder into said conduit on the pressure stroke of the piston, whereby to be delivered into the water which is to be treated thereby.

One objective, generally speaking, is to structurally, functionally, and otherwise improve upon similarly constructed and performing chlorinators and, in so doing, to provide an expedient and practical mechanical apparatus in which manufacturers will find their manufacturing, repair and economy requirements effectually taken care of, and the users will find their expected needs of adjustment and use satisfactorily met.

Generally speaking, it has been observed that prior art adaptations and apparatus for chlorinating purposes usually work under a predetermined and set pressure system. The present apparatus, as a better solution of the problem, is structurally designed and functions to operate under relatively high pressure requirements.

As has been ascertained from an experimental apparatus in use, a simple linearly straight pump is utilized, the same being aptly installed for simple and practical operation between a base-supported prime mover and cross-head with all of the parts, that is the pump, cross-head, prime mover and operating connections mounted in an accessible easy-to-repair manner atop said base.

Using a simple T-coupling on the intake end of the pump cylinder makes it possible to operatively connect the chlorine container or tank to the intake end of the coupling by way of a line having a check valve therein and also promotes satisfactory use of a chlorine supply or take-off conduit which is connected with the discharge branch of the T-coupling by way of an alternatively functioning check valve.

Other objects, features and advantages will become more readily apparent from the following description and the accompanying sheets of illustrative drawings.

In the accompanying drawings wherein like numerals are employed to designate like parts through the views.

Figure 1:
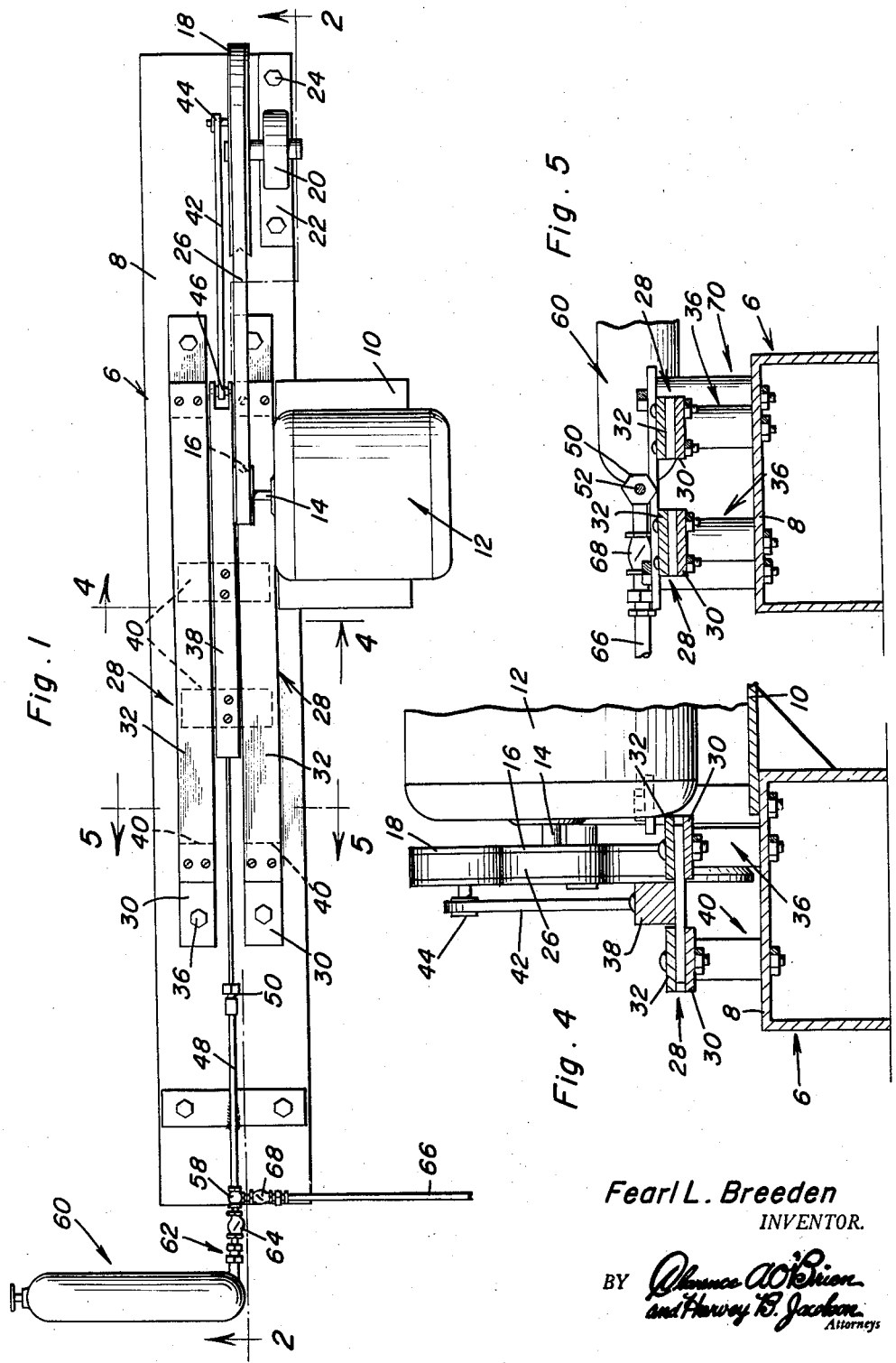
Fig. 1 is a top plan view of a pressure pump chlorinator or apparatus constructed in accordance with the principles of the present invention.

Figs. 4 and 5 are sections on the lines 4—4 and 5—5 respectively, of Fig. 1.

This apparatus is to be installed two to twenty feet (more or less) from any water pump and will make the necessary revolutions per minute to take care of purification of whatever volume of water is needed; the more revolutions, the more chlorine the invention will inject into the water. Two check valves are used; one valve pulls chlorine into the cylinder and the other valve injects chlorine from the cylinder into the water system. In the case of a deep well or cistern, the chlorine container is located at the left of the cylinder or intake valve. The container may be made of wood, plastic or stone jar, of ten to sixty gallon capacity, depending on volume of water needed and such containers may be purchased commercially.

Referring now to the drawings the aforementioned base is denoted generally by the numeral 6 and is preferably in the form of a so-called channel iron the horizontal web portion of which is denoted at 8. All of the principal parts are mounted accessibly atop said web. A suitable shelf or plate 10 is appropriately mounted on the base and provided with a prime mover. By preference this is a suitable electric motor 12 the shaft 14 of which is provided with a pulley 16 lined up with a larger speed reducing pulley 18. The latter is mounted in a bearing 20 on a perch 22 removably bolted by bolts and spacers as at 24 to one end portion of the web. An appropriate belt 26 is trained over the respective pulleys.

A cross-head structure is supported atop the base on the intermediate portion of the base and comprises spaced parallel guide tracks 28 each including a lower horizontal strip member 30 and a complemental member 32 bolted thereto with spacers 34 intervening and providing the desired trackway. The strip members 30 are removably and accessibly bolted to the base as at 36. A rigid linearly straight reciprocating bar 38 is arranged between the tracks and provided with removable cleats 40 which constitute cross members and have their end portions slidable in the respective trackways. This provides the reciprocating cross-head and track assembly. The numeral 42 designates a pitman which has one end eccentrically pivoted as at 44 to the aforementioned pulley 18. The other end is hingedly or pivotally mounted at 46 to the adjacent end of the bar 38 with the parts in proper reciprocating alignment.

Figure 3:
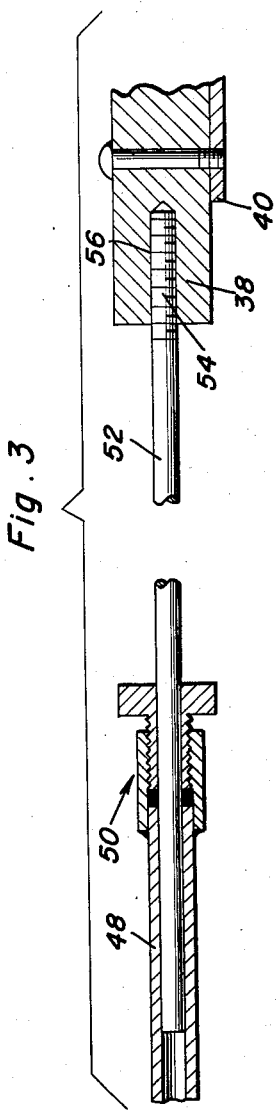
Fig. 3 is an enlarged view showing the pump cylinder and piston rod or piston and its mode of construction and use.

The aforementioned pump comprises a simple linearly straight tube which defines a pump cylinder and which is denoted at 48. On one end it is provided with an appropriate stuffing box 50 (Fig. 3). The rod 52 which constitutes the piston has one end mounted for reciprocation in the bore of the cylinder as shown and the other end is screw threaded as at 54 and adjustably screwed into a socket 56 provided therefor in the cross head bar 38. On the intake end of the cylinder there is a T-coupling 58. Spaced from this and suitably supported is the chlorine tank or container 60 and this is communicatively joined with the intake branch of the coupling 58 by way of a feed line 62 embodying appropriate fittings and including an automatic check valve 64 located to the left of the T-coupling. The chlorine take-off or delivery line is here referred to as a conduit 66 and this has suitable fittings and includes a second automatic check valve 68 which is connected with the discharge branch of the T-coupling.

Figure 2:
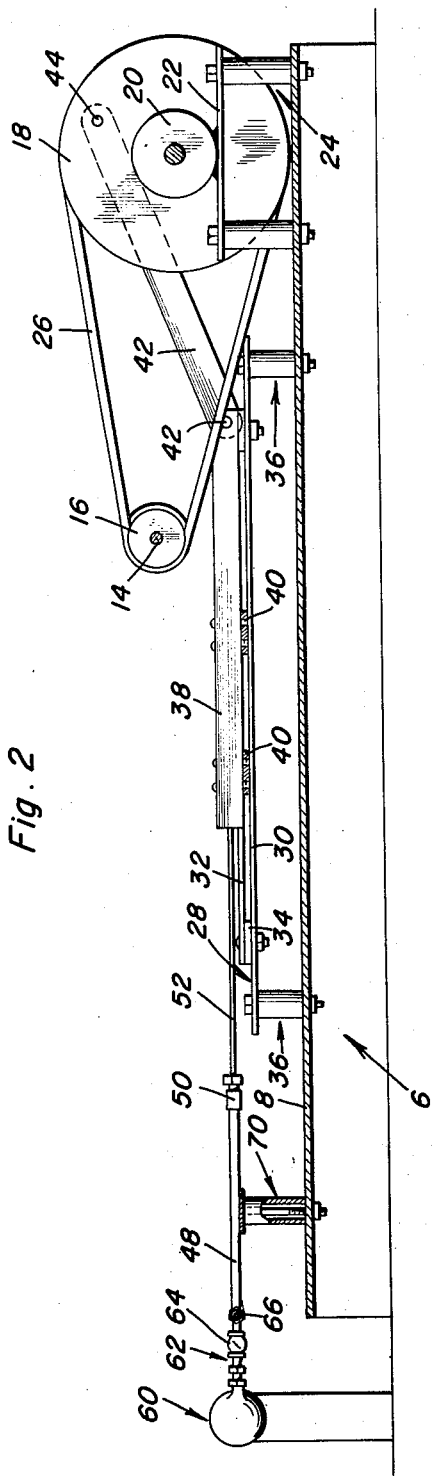
Fig. 2 is a view with parts in section and elevation taken on the section line 2—2 of Fig. 1 looking in the direction of the arrows.

Any appropriate means such as the spacer and bolt arrangement seen at 70 in Fig. 2 may be employed to support the pump or cylinder and piston at the proper level and in relationship to the other parts.

It is understood that the expression "prime mover" is used to signify the fact that any suitable gasoline engine or power plant may be employed to drive or reciprocate the cross head. Although the pulley and belt arrangement is preferred, direct gearing (not shown) may be substituted to properly operate the pitman and cross head.

The operation of the cross head by way of the power plant disclosed obviously reciprocates the piston back and forth in the cylinder to attain the desired pumping result. This results in drawing the intended or desired amount of chlorine from the container 60 and sending it through the valved line 62 into the intake end of the cylinder. This is accomplished on the suction stroke of the piston. On the return or power stroke the trapped chlorine is forced by way of the check valve 68 into the line or conduit 66 which is connected wtih the water pump or other system of water which is to be treated (not shown).

This pressure pump chlorinator or apparatus is more dependable than the old suction type. It has fewer movable parts and when working a certain amount of chlorine is assuredly discharged into water. Even though the suction type may be running the chlorine supply may not function. On the suction type about the only way to determine it is functioning is to check or analyze the water.

This apparatus may have other uses than purifying water. As an illustration, crude oil operators, I am told, use a device for pumping a chemical into the crude oil to break it down as an aid in refining. The simplicity of this invention, its operation, and the fact it may be manufactured at less cost than other devices suggests a possible multiple use of the same.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. A water chlorinating apparatus comprising a base, spaced parallel guide tracks fixed atop said base, a reciprocable cross-head embodying a bar operable between said tracks and having cross-members fixed thereto and slidable in their respective tracks, a pulley supported on said base and equipped with a pitman pivotally joined at one end to said bar and eccentrically pivoted at its other end on said pulley, an elongated cylinder fixed atop said base in line with said bar, and a rod adjustably connected at one end with said bar and having its opposite end reciprocable in said cylinder by way of a stuffing box carried by the cylinder, said rod serving as a piston, and said cylinder and piston providing a simple mechanical pump, said base comprising an elongated channel iron, the horizontal web portion of which constitutes the base proper, said tracks being fixed on said web, said pulley being supported on said web, said elongated cylinder having its outer end terminating even with the corresponding end of the channel iron, and elevating and supporting means for said cylinder mounted on said web and serving to support the cylinder in a plane in correct operating relationship relative to said tracks and said cross-members.

2. A water chlorinating apparatus comprising a base, spaced parallel guide tracks fixed atop said base, a reciprocable cross-head embodying a bar operable between said tracks and having cross-members fixed thereto and slidable in their respective tracks, a pulley supported on said base and equipped with a pitman pivotally joined at one end to said bar and eccentrically pivoted at its other end on said pulley, an elongated cylinder fixed atop said base in line with said bar, a rod adjustably connected at one end with said bar and having its opposite end reciprocable in said cylinder by way of a stuffing box carried by the cylinder, said rod serving as a piston, said cylinder and piston providing a simple mechanical pump, a T-couplng mounted on the intake end of said cylinder, the intake branch of said T-coupling including a check valve and being adapted to accommodate a connectable end of a supply line for chlorine, and a chlorine dispensing conduit connected to the discharge branch of said T-coupling and having a check valve operatively mounted therein, said check valves cooperating in prerequisite alternating progression so that chlorine is drawn into the cylinder on the suction stroke of the piston and is shunted from the cylinder into said conduit on the pressure stroke of the piston to be delivered into water which is to be chlorinated.

References Cited in the file of this patent

UNITED STATES PATENTS

| | | |
|---|---|---|
| 47,344 | Sutton | Apr. 18, 1865 |
| 913,701 | Cramer | Mar. 2, 1909 |
| 1,030,649 | Cribbins | June 25, 1912 |
| 1,241,604 | Astrom | Oct. 2, 1917 |
| 1,963,867 | Robisch | June 19, 1934 |
| 2,054,824 | Knapp | Sept. 22, 1936 |
| 2,610,643 | Goff | Sept. 16, 1952 |

FOREIGN PATENTS

| | | |
|---|---|---|
| 161,644 | Switzerland | Aug. 1, 1933 |